UNITED STATES PATENT OFFICE.

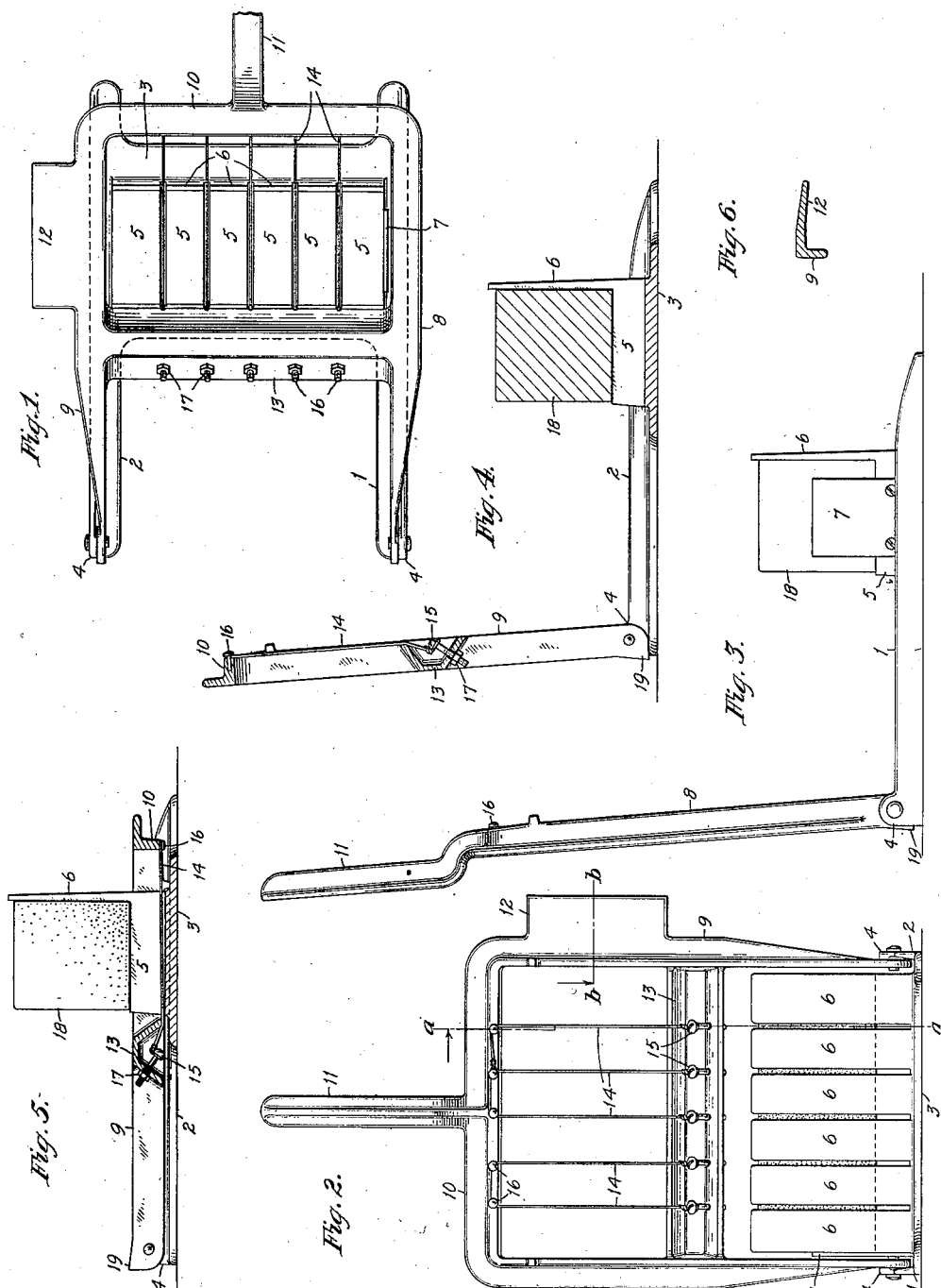

TRACY N. SHAW, OF ROCKFORD, ILLINOIS.

CUTTING-MACHINE.

1,043,472. Specification of Letters Patent. Patented Nov. 5, 1912.

Application filed November 26, 1910. Serial No. 594,399.

*To all whom it may concern:*

Be it known that I, TRACY N. SHAW, a citizen of the United States, residing at Rockford, in the county of Winnebago and State of Illinois, have invented certain new and useful Improvements in Cutting-Machines, of which the following is a specification.

The object of this invention is to construct a machine for cutting brick ice cream into individual slices for table use.

In the accompanying drawings, Figure 1 is a plan view of my improved cutting machine. Fig. 2 is an end elevation in which the frame stands in a vertical position. Fig. 3 is a side elevation. Fig. 4 is a section on dotted line *a a* Fig. 2, in which the frame is in a vertical position. Fig. 5 is a section on dotted line *a a* Fig. 2, in which the frame is in a horizontal position. Fig. 6 is a section on dotted line *b b* Fig. 2.

The base comprises the side bars 1 and 2, and center cross bar 3. The ends of the side bars 1 and 2 are each formed with a perforated ear 4. From the center cross bar 3 rise a plurality of supports 5, each provided with a vertical back 6. One of these supports 5 has a vertical end 7.

The cutter supporting frame comprises the side bars 8 and 9, end bar 10, handle 11, shelf 12 and intermediate cross bar 13. The ends of the side bars 8 and 9 are pivotally connected to the ears 4 of the side bars 1 and 2 of the base. Cutting wires 14 are connected to the end bar 10 and to the cross bar 13 by the screws 15, and studs 16. Nuts 17 connect with the screws 15 and serve to tighten the cutting wires. Some of the cutting wires are in pairs, and their ends are connected to the screws after passing over two of the studs. These cutting wires are so located that in the movement of the frame, they will pass between the supports 6, and cut the brick of ice cream 18 into slices for table use. When the frame supporting the cutting wires stand in the positions shown at Figs. 2, 3 and 4, the ends 19 of the side bars 8 and 9 will rest in contact with the side bars 1 and 2 of the base, thereby preventing it from falling down. The shelf 12 will serve to direct the cut cream into a suitable receptacle. The end 7 and back 6 serve to locate the brick of ice cream on the supports 5.

I claim as my invention.

In a cutting machine of the character set forth, the combination with a base having a plurality of spaced supports, said supports having upstanding backs along one side, and one of the end supports having an upstanding stop, of an open frame pivoted to the base on the side of the supports opposite to that having the backs, spaced cutters carried by the frame and moving between the backs and supports, and a shelf fixed to and carried by the frame and disposed on the side of the same opposite to the support having the stop, said shelf moving with the frame into a position in alinement with the supports when the cutters are passed between the same.

In testimony whereof I have hereunto set my hand in presence of two subscribing witnesses.

TRACY N. SHAW.

Witnesses:
  A. O. BEHEL,
  E. D. E. N. BEHEL.